United States Patent [19]

Tolonen et al.

[11] Patent Number: 4,683,095
[45] Date of Patent: Jul. 28, 1987

[54] EARLY PROGRESSIVE JUNCTION EXTRUSION PROCESS AND SYSTEM

[75] Inventors: Eric Tolonen, Gladwin, Mich.; Clifford J. Tubbe, Kitchener, Canada; George G. Giesbrecht, Kitchener, Canada; John A. Wiens, Kitchener, Canada

[73] Assignee: The Uniroyal Goodrich Tire Company, Akron, Ohio

[21] Appl. No.: 732,196

[22] Filed: May 8, 1985

[51] Int. Cl.⁴ .................. B29C 47/06; B29C 47/32
[52] U.S. Cl. .................. 264/171; 264/177 R; 264/177.16; 425/131.1; 425/192 R; 425/194; 425/327; 425/462
[58] Field of Search .................. 264/171, 177 R; 425/131.1, 462, 188, 190, 192 R, 194, 133.5, 327

[56] References Cited

U.S. PATENT DOCUMENTS

| | | |
|---|---|---|
| 2,569,373 | 9/1951 | Fay . |
| 2,807,833 | 10/1957 | Schanz . |
| 2,897,543 | 8/1959 | Weston et al. . |
| 3,280,427 | 10/1966 | Smith . |
| 3,486,195 | 12/1969 | Greenwood et al. . |
| 3,584,343 | 6/1971 | Kohlepp et al. ............... 425/327 |
| 3,871,810 | 3/1975 | Geyer . |
| 3,947,201 | 3/1976 | Ellwood ............... 425/327 |
| 4,060,368 | 11/1977 | Theysohn ............... 425/376 B |
| 4,137,027 | 1/1979 | Roger ............... 425/133.5 |
| 4,197,069 | 4/1980 | Cloeren . |
| 4,358,261 | 11/1982 | Ohki ............... 425/131.1 |
| 4,372,736 | 2/1983 | Gooch et al. ............... 425/192 R |
| 4,526,528 | 7/1985 | Kline et al. ............... 425/133.5 |
| 4,539,169 | 9/1985 | Nixon et al. ............... 425/194 |
| 4,548,568 | 10/1985 | Herbert et al. ............... 425/462 |
| 4,552,521 | 11/1985 | Linnstaedter ............... 425/131.1 |
| 4,556,382 | 12/1985 | Nadeau, Jr. et al. ............... 425/462 |

FOREIGN PATENT DOCUMENTS 1230869 5/1971 United Kingdom ............ 425/192 R

Primary Examiner—Jeffery Thurlow
Attorney, Agent, or Firm—Harry F. Pepper, Jr.

[57] ABSTRACT

Method and Apparatus for forming an elastomeric strip formed from at least two elastomeric compounds, for example to use as a pneumatic tire tread strip. Extrusion means advance two or more elastomeric materials (60) under pressure toward a final die chamber; from which material is extruded between a final die (50) and a roller (70). A head assembly (30) and a preform die (62, 64) are positioned in serial flow relationship between said extrusion means and said final die, and flow chambers formed within said head assembly and said preform die intercommunicate said extrusion means with said final chamber. Flow chambers within the preform die converge to at least one common junction within said preform die to form a single preform die exit chamber wherein a multi-material flow of elastomeric materials is established for passage into said final chamber for final extrusion therefrom.

13 Claims, 21 Drawing Figures

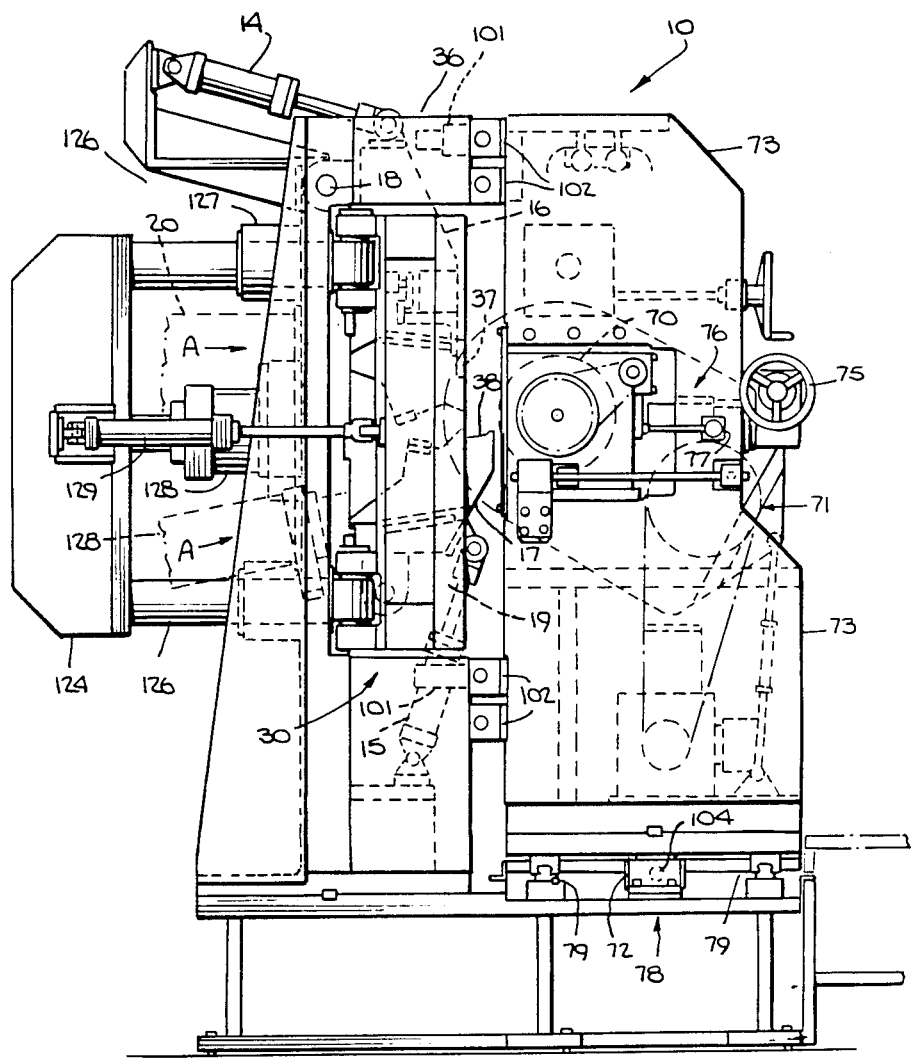

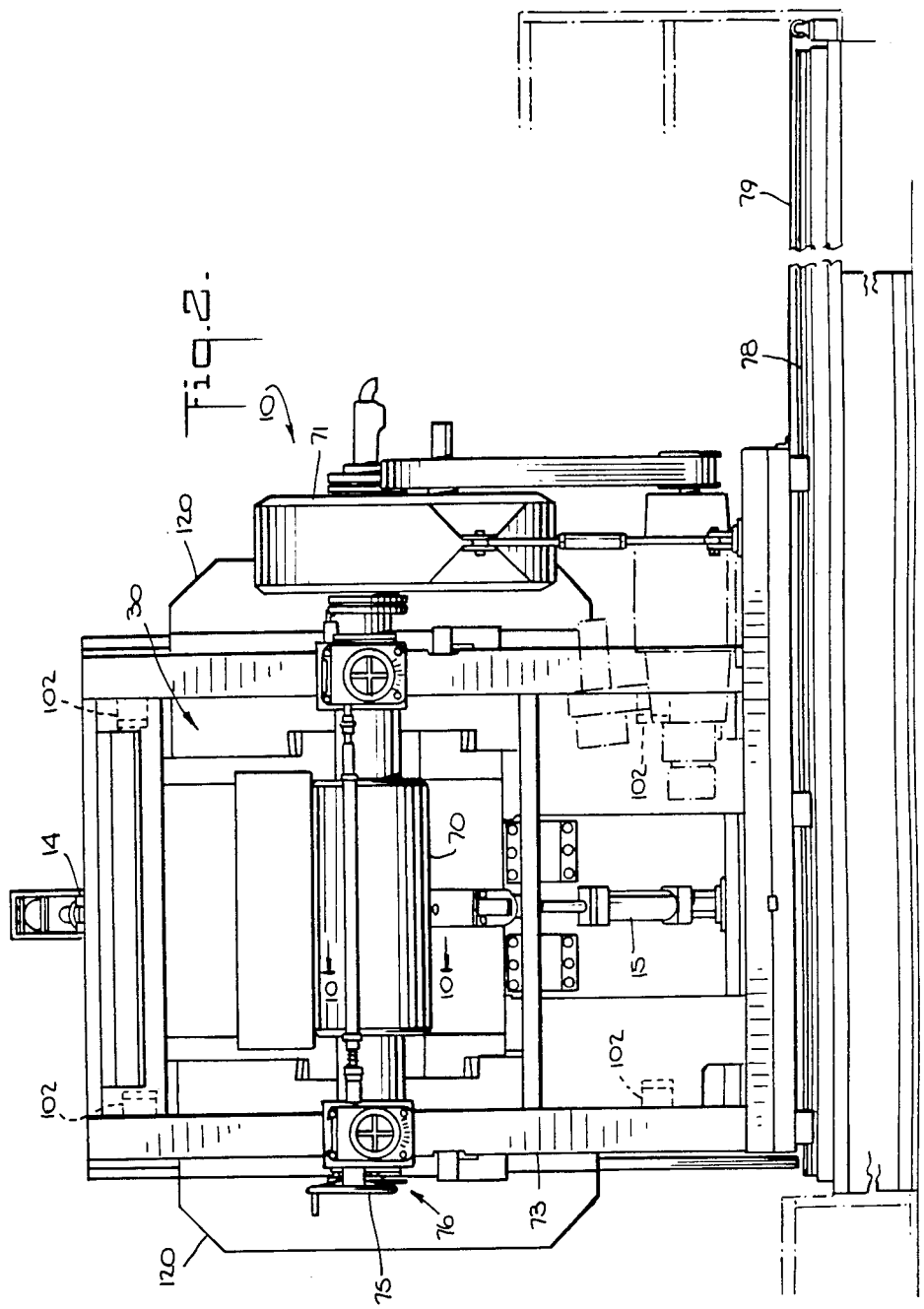

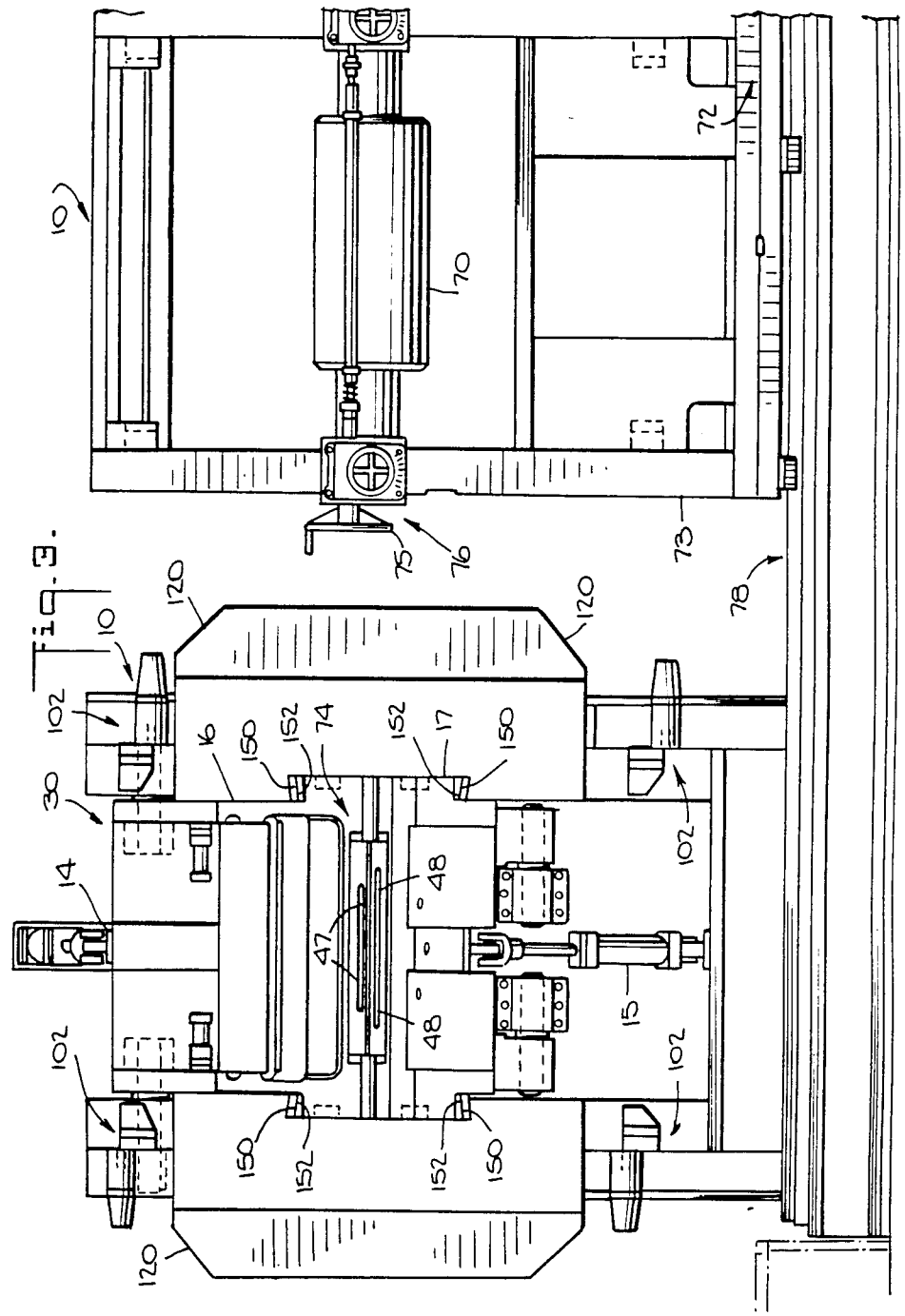

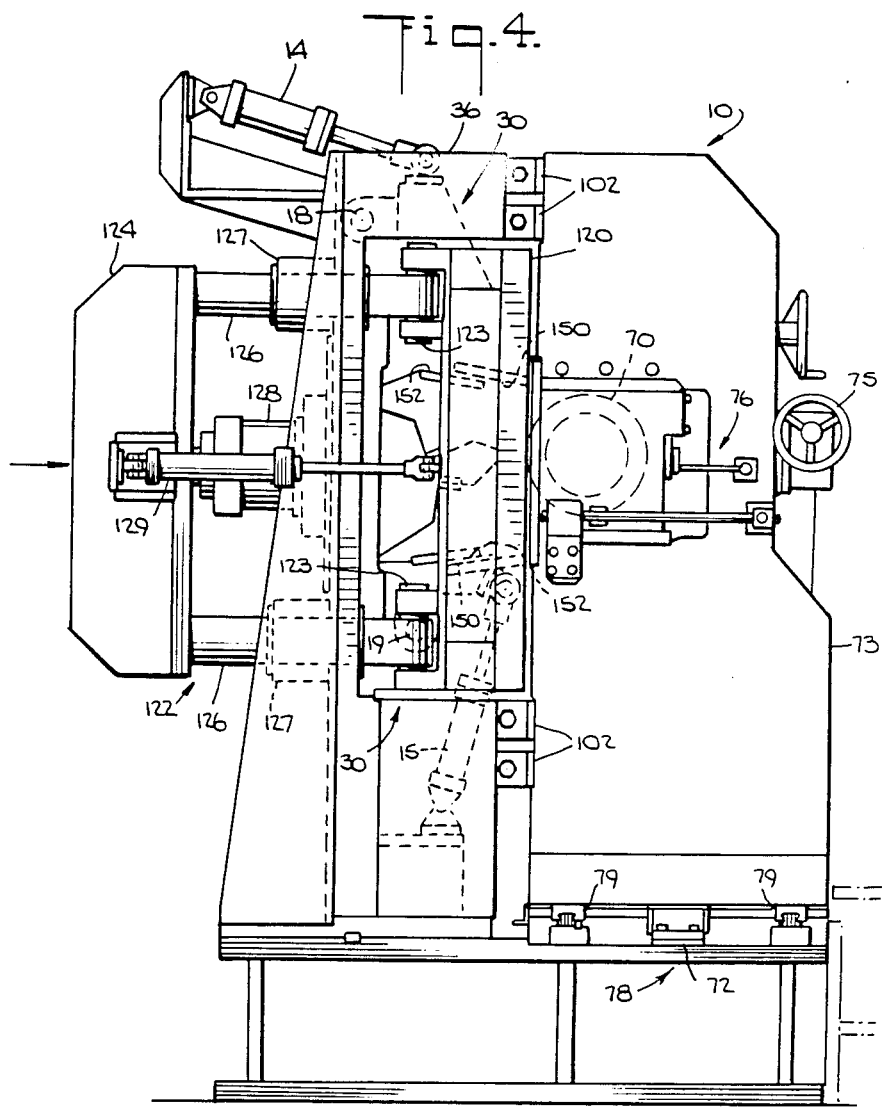

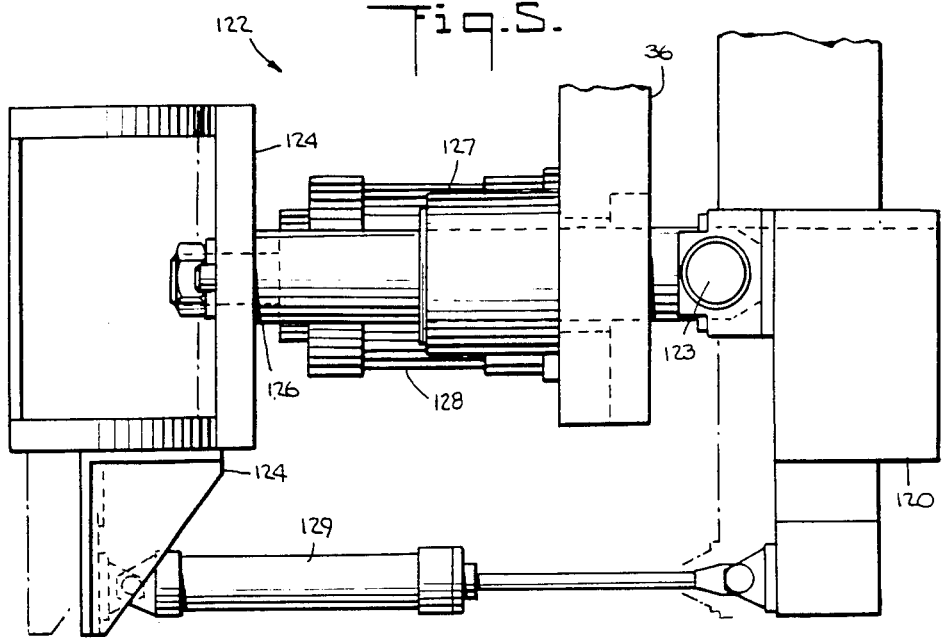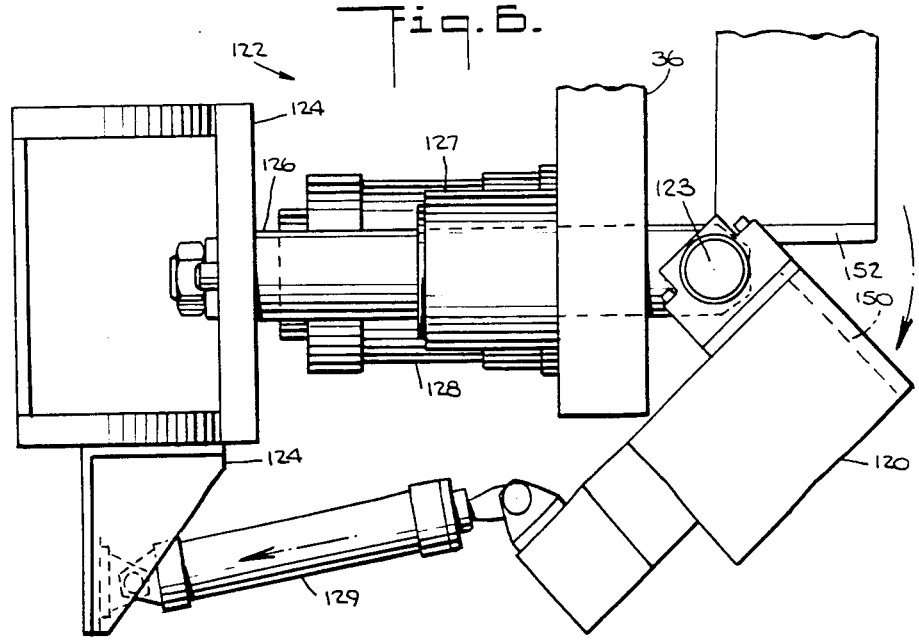

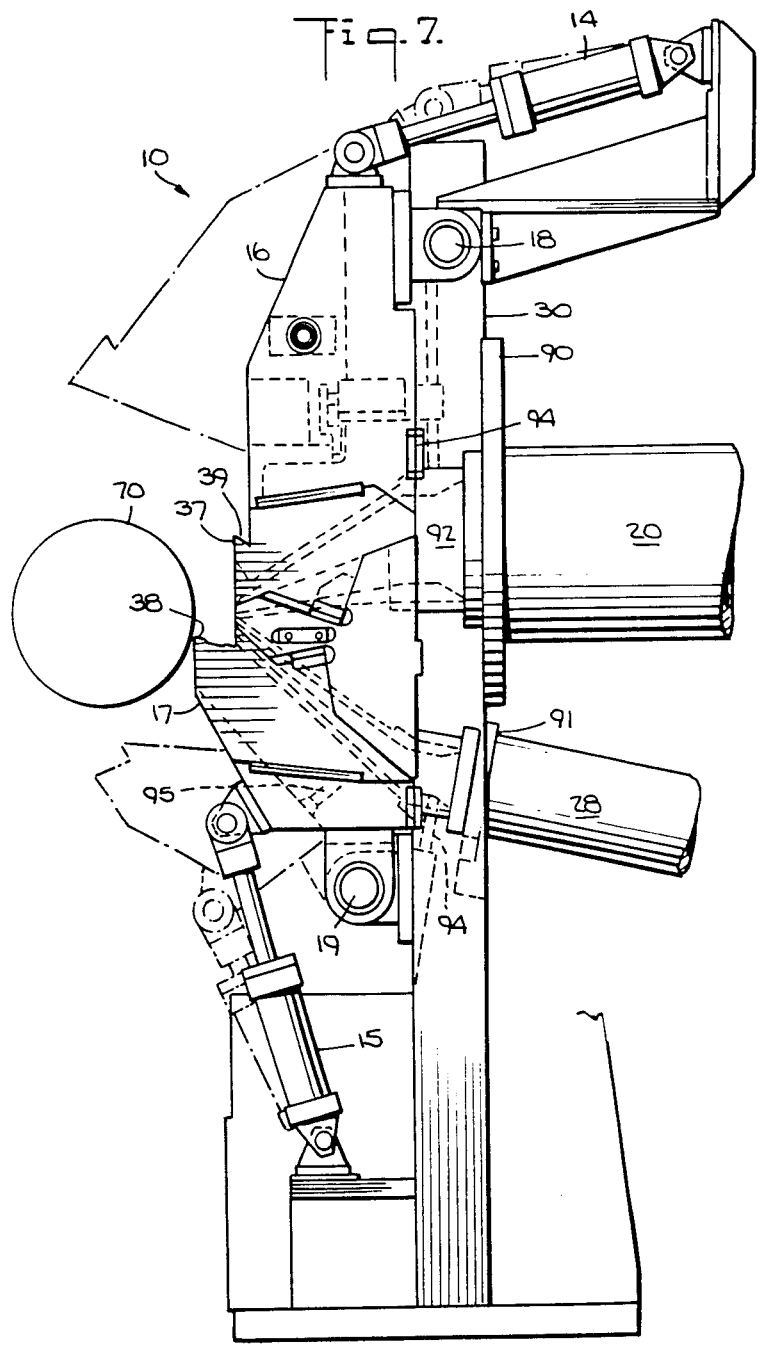

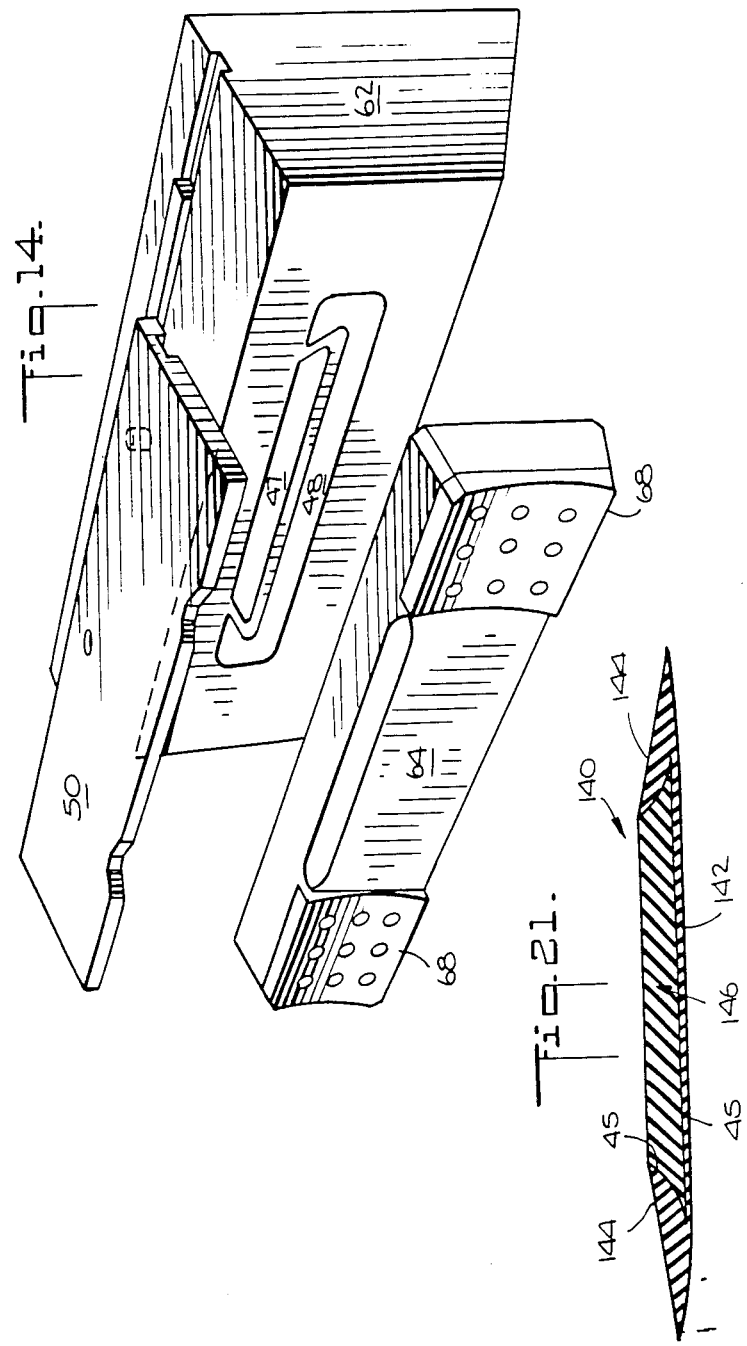

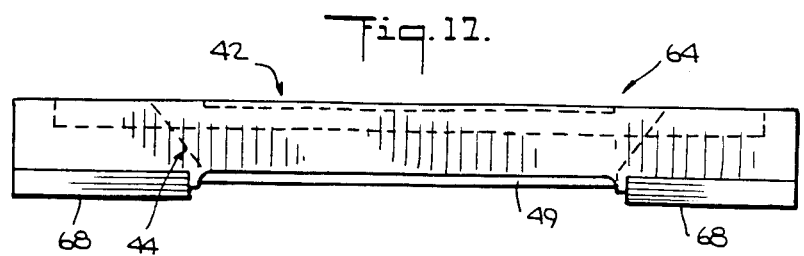
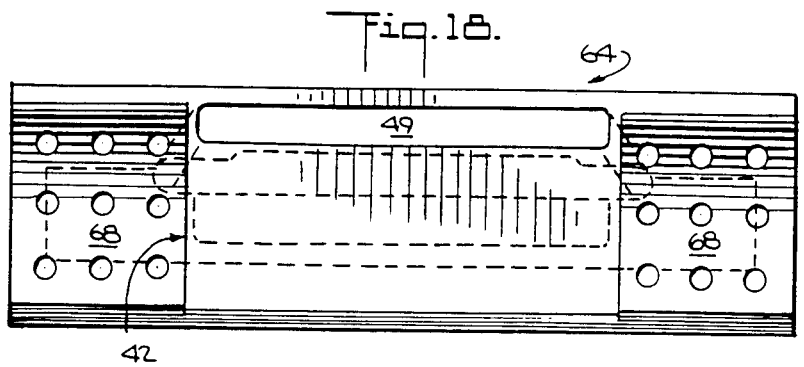
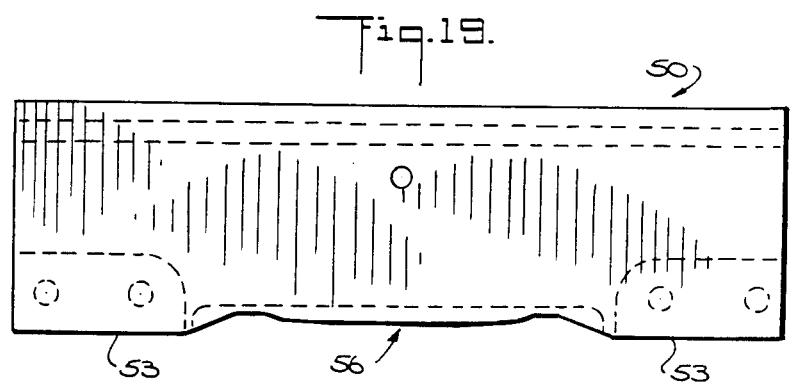
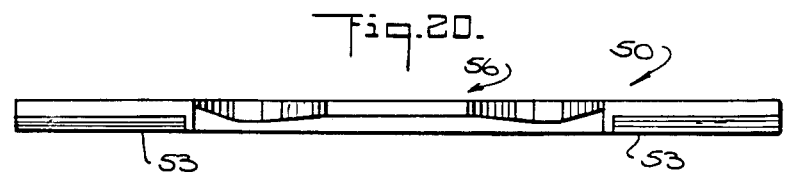

EARLY PROGRESSIVE JUNCTION EXTRUSION PROCESS AND SYSTEM

BACKGROUND OF THE INVENTION

1. Field of the Invention

The present invention relates to an apparatus for forming a continuous elastomeric strip, such as in the nature of a tire tread slab, and more particularly to a method and apparatus in which there is utilized an assembly comprised of a plurality of extruders feeding different compositions of elastomeric material into a preform die that joins the different compositions to form a multi-material slab that is extruded through a roller die as a continuous elastomeric strip.

2. Description of Related Art

Generally speaking, conventional methods of producing tire tread slabs utilize apparatus that extrude elastomeric materials under pressure through slit-dies that are contoured to appropriately impart to the elastomeric material, of which the tread slab is constituted, a preferred cross-sectional contour.

In addition, there are also methods that utilize roller-die combinations that extrude elastomeric material under pressure between a restriction orifice and a roller die. This later type apparatus is disclosed in U.S. Pat. No. 3,871,810 assigned to UNIROYAL, Inc.

Both of these types of extrusion methods have been adapted in recent years to form elastomeric strips that are comprised of two or more different types of material or extrudate. This normally requires internal flowpaths that initially start as two or more separate flow channels originating with two or more separate extruders, eventually joining together to combine the separate materials within a single slab that ultimately is formed into a tire tread. The advantage of combining different types of elastomeric material into a single tire tread is that each material can be used in a specific physical section of the tread where the material has the most advantageous physical properties for improving overall performance of the tire tread. Specifically, it has been found that it is desirable to utilize one material in the radially outer center portion (cap portion) of the tread which is the part that normally contacts a road surface. This material might have a high coefficient of friction for improving vehicle handling characteristics. It might also be a highly wear-resistant material for the purpose of improving tire tread life.

In contrast, the lateral portions of the tire tread, also known as the buttress of the tire tread, would most desirably be made of a different material such as a highly elastic and flex resistant material that can absorb major stresses encountered during significant changes in direction of a subject vehicle. This compound must also be compatible with tire sidewalls to form a cured junction between the sidewall and tread which will not separate during its intended service. This buttress portion of the tread is also known as the "wings" of the tire tread.

In addition, that portion of the tread that underlies the wear resistant surface, sometimes called the cap base or tread recoat, might be formed from the same material as the "wings" or a third material designed to adhere to the outer stock of the tire carcass and supply a modulus transition between the tread portion and a top carcass skimcoat. If this third material has a low hysteresis, then proper control of the contour and volume of this material is desirable to improve the tire power consumption for vehicle fuel efficiency by reducing tire rolling resistance.

While these different materials will generally have markedly different viscosities, they must be brought together to form a single cohesive elastomeric strip. Normally this will be accomplished inside an extrusion head with multiple flow channels that, at some point, are joined together.

The general practice in the prior art has been to join multiple materials or compositions at a physical location just before the elastomeric strip is extruded out onto a moving belt or onto a rotating roller. It has been generally assumed that it is necessary to join the different materials at or near the final exit of a multi-material extrudate because it would be difficult or impossible to control the boundary between the different materials within the elastomeric strip. Additionally, there has not been any widely known advantage to joining the different materials at a point significantly upstream of the final exit of the extrudate.

Previous technology has also been based on an assumption that the direction of the flow channels must be changed gradually into the shape required for a final extruded profile because any rapid changes in direction would cause extrusion difficulties. Specifically, it has been believed that any major turns or changes in direction in the passages before the junction is formed would destabilize the final extrudate causing variations in boundary location. Also, it has been generally believed that the different materials must be advanced to their junction at the same velocity and pressure to the point where the junction is made.

These assumptions have lead to unnecessary equipment complications, difficulties in die design and restrictions in extrudate or tire tread design.

Associated with the problem of maintaining proper material boundary location is the desire on the part of tire manufacturers to be able to vary the boundary location, within a small range, without having to resort to changing dies within the extrusion equipment. This kind of control within a small range would permit fine tuning of equipment to more precisely control material boundary location during equipment operation, instead of being forced to shut machinery down for die substitution.

Another difficulty that is a constant concern to manufacturers of tire tread extrusion equipment is the problem of providing convenient access to the flowpaths within the equipment to enable operators to efficiently clean the equipment. This is a greater problem than might normally be expected because tire manufacturers frequently have to interrupt extrusion operations to change dies for different tire sizes or to accommodate shift changes or production holdups. Every time these interruptions occur, the elastomeric material already in the machine tends to harden inside the flowpaths and it must be cleaned out before the next run is started. This requires labor and, worse yet, shuts down expensive equipment longer than necessary.

To minimize these problems, extrusion equipment manufacturers are incorporating more and more features into the equipment to permit easier cleaning of the internal flowpaths. In spite of these efforts, equipment downtime during cleaning remains a major concern to extrusion equipment manufacturers.

Finally, it has been a constant concern of the tire tread equipment manufacturers to provide a method and apparatus that extrudes two or more materials in a strip with a high degree of adhesion between the different materials at the boundary location.

SUMMARY OF THE INVENTION

Accordingly, it is a principal object of the present invention to provide a new and improved apparatus for joining a plurality of elastomeric materials prior to extrusion through a roller-die combination in a fashion that provides a consistently located boundary between different materials in the finally extruded elastomeric strip.

It is another object of the present invention to provide an apparatus and method of extrusion that provides the ability to vary material boundary locations within the extruded elastomeric strip without resorting to shutting the equipment down or physically changing dies.

It is also an object of the present invention to provide a method and apparatus of extruding multiple materials with a high degree of adhesion between the different materials at the boundary location.

To this end, the present invention relates to a method and apparatus for forming a multi-material continuous elastomeric strip, such as a tire tread slab for pneumatic tires. The apparatus comprises a plurality of extrusion means for advancing separate elastomeric materials under pressure through separate flow chambers, a preform die through which the flow chambers converge together to a common junction within the preform die. From the common junction, the multi-material flowstream flows through a preform die exit chamber on to a final die. The configuration of the preform die exit chamber permits the plurality of materials to adhere to each other to establish a material boundary location within the elastomeric strip prior to final shaping in a final chamber formed between a roller and a final die confronting and converging against the rotating roller upon which the elastomeric strip is deposited in the form of a tire tread slab. The placement of the common junction upstream of the final die also aids in allowing the operator to control the location of the material boundary within the extruded strip by controlling pressure or extrusion rate of the different materials within their individual flowpaths.

BRIEF DESCRIPTION OF THE DRAWINGS

The above and additional objects and advantages of this invention will be more clearly understood from the following detailed description when read in conjunction with the accompanying drawings in which:

FIG. 1 is a side elevation view of the apparatus of the subject invention;

FIG. 2 is a front elevation view of the apparatus of the subject invention;

FIG. 3 is a front elevation view of the subject invention with a roll frame and associated components moved away from the remainder of the apparatus of the subject invention;

FIG. 4 is a side elevation view of the subject invention, similar to FIG. 1 but omitting certain components shown with a dashed outline in FIG. 1;

FIG. 5 is a plan view of a side clamp in a closed position along with associated operating mechanisms;

FIG. 6 is a plan view of the side clamp shown in FIG. 5 but in an open position;

FIG. 7 is a side elevation view of a head assembly with internal flow chambers shown in dashed outline;

FIG. 14 is a perspective unassembled view of the preform die and the final die of FIG. 13 with the dies partly disassembled;

FIG. 17 is a plan view of a second section of the preform die;

FIG. 18 is a front elevation view of the second section of the preform die;

FIG. 19 is a plan view of a final die;

FIG. 20 is a front elevation view of the final die; and

FIG. 21 is a cross-sectional view of an elastomeric product extruded from one embodiment of the subject invention.

DETAILED DESCRIPTION OF THE INVENTION

Figure 8:
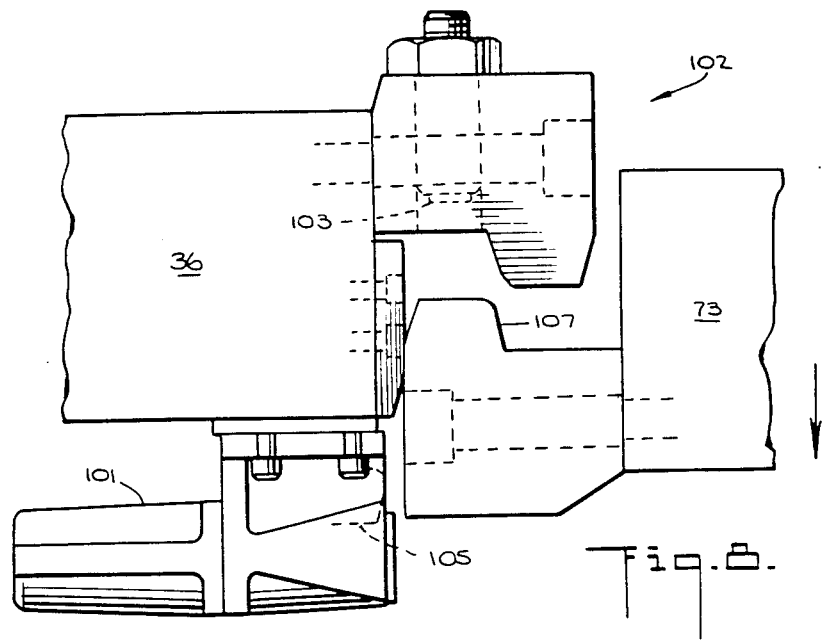
FIG. 8 is an enlarged plan view of a roll frame locking device assembly in an unlocked position.

Referring now to the drawings and more particularly to FIGS. 1 through 7, 11 and 12, all of which are elevation views of the subject invention or portions of the invention, FIG. 1 is a side elevation view that illustrates several of the primary structural mechanisms of the apparatus 10 of the subject invention. The apparatus 10 is a machine that extrudes a multi-composition elastomeric strip onto a rotating roller 70 from which the strip is deposited onto a belt (not shown) or something similar for transfer to further operations or storage. A number of mechanisms are associated with roller 70 and are mounted within a roll frame 73 for the purpose of positioning and rotating the roller. In FIG. 3, the roll frame 73 has been moved laterally away from the remainder of the apparatus 10. Movement of the roll frame will be described later in this specification.

Figure 10:
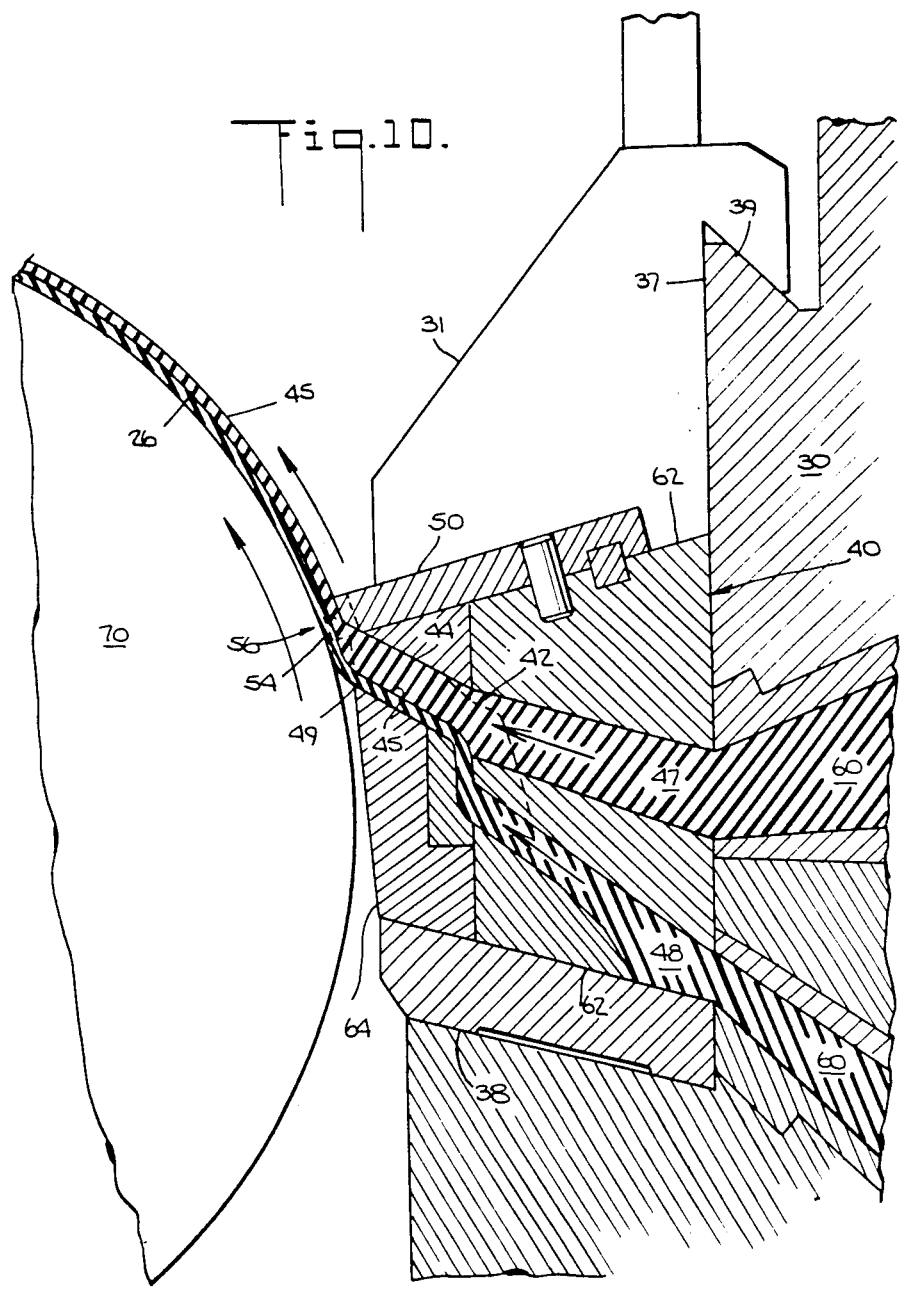
FIG. 10 is an enlarged cross-sectional view of a preform die, final die, die holder and material flow through the dies onto a roller taken along line 10—10 in FIG. 2.
Figure 11:
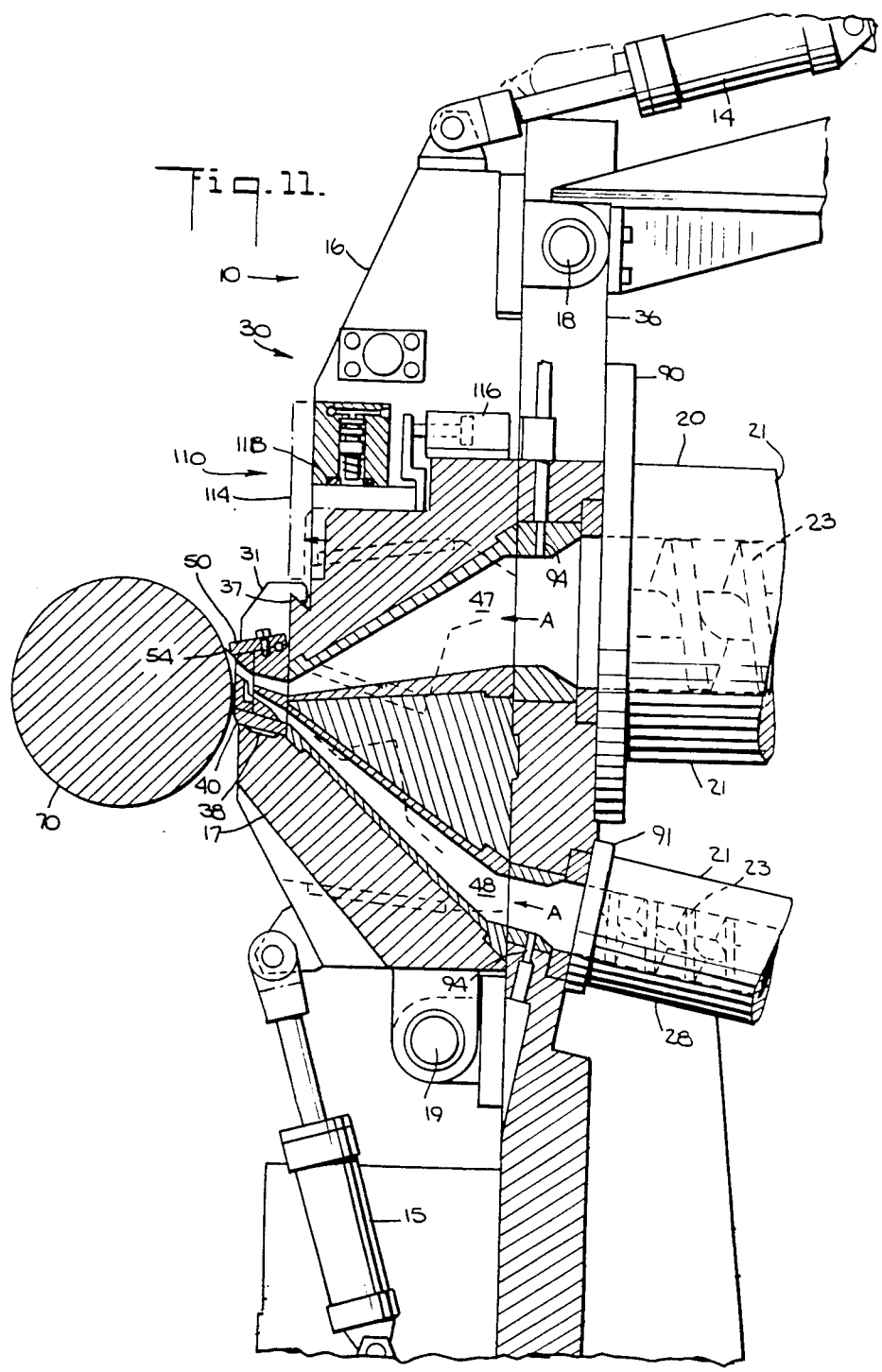
FIG. 11 is an elevation view of the head assembly partly in cross-section and partly broken away.
Figure 12:
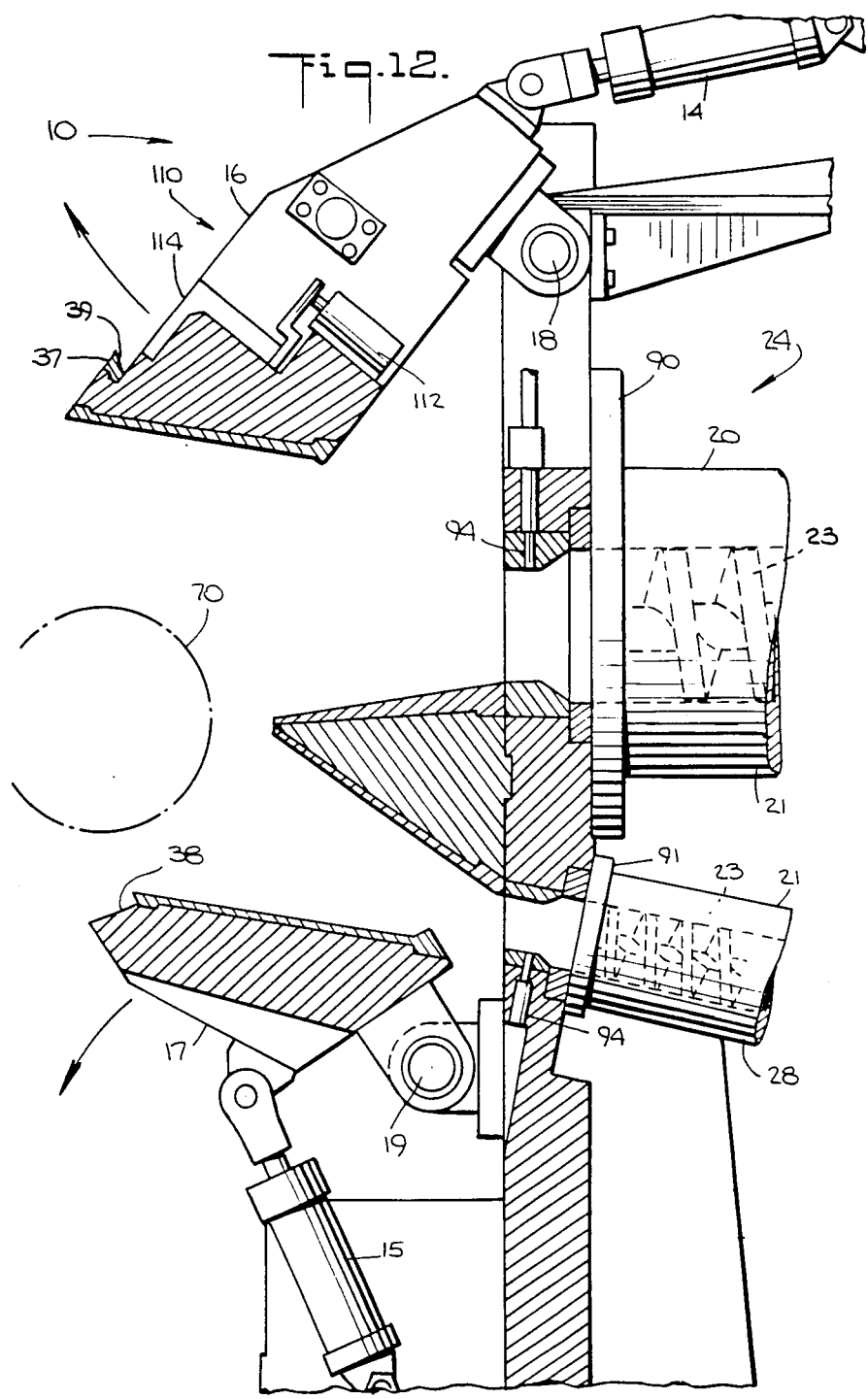
FIG. 12 is an elevation view of the head assembly of FIG. 11 with an upper head section thereof swiveled upwardly and a lower head section thereof swiveled downwardly.

The apparatus 10 as shown in FIGS. 1, 7, 11 and 12 employs two extruders 20 and 28 which are the source of elastomeric material within the apparatus. Each of the extruders 20 and 28 as shown in FIG. 11 includes an extrusion barrel 21 in which, in a conventional manner, is rotatably disposed an extrusion screw 23 that typically has a helical thread. Each extrusion screw 23, upon rotating, acts to extrude and feed elastomeric material 26 (shown in FIG. 10 but not shown in FIGS. 1 or 11) in the direction of arrows A toward a head assembly 30.

The extruder head assembly 30 is an assembly of components with internal flowpaths or chambers for the elastomeric material, the purpose of which is to collect the elastomeric material from the extruders and direct that material into one or more forming dies that shape the elastomeric material into the desired final configuration. In the apparatus shown in FIGS. 1 through 4, 7, 11 and 12, the desired final configuration is that of a tire tread for a pneumatic tire. While the apparatus shown employs two extruders, it will be apparent to those skilled in the art that other embodiments could be utilized which would employ three or more extruders each extruding a different material or any potential combination of materials. The elastomeric material may be a natural or synthetic rubber, a blend of natural and synthetic rubbers, a synthetic elastomeric resin, combinations of natural rubber and synthetic resins, or any other suitable composition generally utilized in the manufacture of elastomeric articles such as tread slabs.

Referring again to FIG. 11, the extruders 20 and 28 are provided with a means, generally well known to those skilled in the art, for varying feed rate of material from each extruder so that the operator of the apparatus can control extrusion rates into the apparatus which, additionally, enables the operator to control extrusion rates out of the apparatus.

The extruders themselves can be any of many different types or varieties which are commercially available from several sources. In the apparatus shown in FIG. 11, the upper or first extruder 20 may be a 10 inch diameter extruder and the lower or second extruder 28 may be a 4½ inch diameter variety.

The upper or first extruder 20, as shown in FIGS. 1 and 11, is larger in diameter than the second extruder 28 which is positioned below the first extruder. Typically, each of these extruders is supplied with a different elastomeric material. The first extruder 20 is larger in diameter because the final extruded elastomeric strip is intended to contain a larger percentage of the elastomeric material emitted from extruder 20 in respect to the material emitted from the second extruder 28. In the case of tire tread slabs, it is important that the correct percentages of material are supplied to the apparatus and, in turn, that the final extruded tread form actually contains the correct percentages of different materials. Additionally, it is also very important that the boundary location between different materials is properly located within the extruded slab. As noted previously, the purpose of the subject invention is to receive the different elastomeric materials from the separate extruders and properly combine those materials into a final extruded elastomeric strip.

Referring again to FIG. 11, at the end of the apparatus opposite from the extruder 20, there is shown a roller 70 that is rotated during operation of the apparatus and upon which the extruded elastomeric strip is deposited. The apparatus associated with this roller 70 which rotates the roller and positions the roller will be described later in this specification.

Between the extruders and the roller 70, the elastomeric material flows through the head assembly 30, a preform die 40 and a final die 50, all in serial flow relationship. A die holder 31 positions the preform die and final dies as shown. The flow passages that the elastomeric material follows through the head assembly 30 of the apparatus 10 are shown in solid lines in FIG. 11. The flow passages through the dies 40 and 50 are relatively complex and are not shown in detail in FIG. 11, but will be fully described later in this specification.

Referring now to FIGS. 7 and 11, the downstream end of the head assembly 30 is provided with an upper surface 37 and a lower surface 38 which both act in conjunction with cooperating surfaces of the head assembly 30, to properly locate the die holder 31 in respect to the remaining portions of the apparatus 10. When the die holder 31 is properly located on the upper surface 37 and lower surface 38, the flow passages through the dies will line up correctly with flow passages through the head assembly 30.

The purpose of the dies 40 and 50 is to join the multiple flowpaths of the different elastomeric materials into a single flowpath and to finally shape the elastomeric material inside the final die 50 as it is extruded out onto the roller 70.

As shown in FIGS. 7 and 11, the extruders 20 and 28 are held in place against upper and lower head insert plates 90 and 91, respectively, both of which are properly configured to receive the elastomeric material extruded by the extruders under pressure. From the upper and lower extruder insert plates 90 and 91, the material enters upper and lower transition chambers 92 and 93 respectively. Both of the transition chambers widen laterally, or in other words, the horizontal dimension increases, as the chambers progress in the direction of the roller 70 (from right to left as illustrated in FIGS. 7 and 11). Each of the chambers also decreases in height or, in other words, decreases in the vertical dimension in that same direction. While it is desirable to limit the length of the transition chambers 92 and 93, the material flow within these chambers can be turned in any direction desired as it moves toward the dies as long as the final direction of flow within chambers 92 and 93 is generally within ninety (90) degrees of the direction of flow of the combined stream when the junction of the different materials is made. The applicants also have found it to be important that the cross-sectional area, if changed within the transition chambers, is either increased or decreased in a gradual or progressive manner. This is because if the cross-sectional area is changed only gradually then the velocity of the material flow also is changed in a gradual and progressive manner. Any erratic material velocity changes would build excessive head pressure which would increase extrusion temperatures. In the transition chambers shown in FIGS. 7 and 11, the cross-sectional area gradually decreases in the direction of material flow, and this has been found to be a very workable physical configuration.

Still referring to FIGS. 7 and 11, immediately downstream of the upper and lower head insert plates 90 and 91, pressure transducers 94 are provided within the apparatus for the purpose of monitoring and controlling flow rates of the material from the extruders into and through the head assembly 30.

The head assembly 30 can also be provided with water connection openings 95 (FIG. 7) for the purpose of supplying a cooling or heating water flow into the head assembly 30 during operation of the apparatus 10. This can become necessary because of the high pressures and temperatures that often result during continuous operation.

As the material continues to flow through the transition chambers 92 and 93, the chambers themselves converge toward each other but do not actually intersect each other within the head assembly 30. At the downstream end of the head assembly 30, both of the flow passages of material enter the preform die 40 (FIG. 11) as separate flowpaths.

Referring briefly to FIG. 3, the apparatus 10 is depicted with the roll frame 73 and roller 70 moved to the side and with the die holder 31 and dies 40 and 50 removed from the head assembly 30. In this view it can be appreciated that the apparatus shown has been constructed to extrude a single elastomeric strip. The apparatus could also be configured to extrude multiple strips. If, for example, two strips are extruded, there would be two separate first flow chambers 47 and two separate second flow chambers 48. Each of these sets of flow chambers would communicate with a separate set of dies 40 and 50. Each separate set of dies would finally shape its own separate elastomeric strip that would be finally extruded out onto the roller 70.

HEAD SECTION MOVEMENT

Referring to FIGS. 1, 7, 11 and 12 the apparatus 10 is provided with upper and lower hydraulic cylinders 14 and 15, respectively, above and below the head assembly 30, in a position that enables the cylinders to open and close an upper head section and lower head section 16 and 17, respectively, upon actuation of the cylinders. The movement of the upper and lower head sections 16 and 17 is a pivoting action around pivot points 18 and 19 respectively.

In FIGS. 1, 7 and 11, the upper and lower head sections are shown in a closed position with a solid outline. They are shown in an open position with a dashed outline in FIG. 7 and with a solid outline in FIG. 12. The purpose of opening and closing the upper and lower head sections is to open the internal flowpaths within the head assembly to provide access for cleaning the material flowpaths when so desired. In the configuration shown, the cylinders 14 and 15 are heavy duty cylinders with an 8 inch stroke. Other types and forms of cylinders could also be utilized.

A variety of other mechanical movements within the apparatus 10 are controlled by other hydraulic and pneumatic cylinders. This is because several of the major structures within the apparatus 10 are of a size and weight that requires mechanical assistance in their movement and cannot be readily positioned or moved simply by hand operation. Additionally, automatic mechanical movement of these structures aids in decreasing manual labor so that the machine can be more efficient. Most of these structural movements are for the purpose of opening certain portions of the apparatus 10 to provide access for cleaning and similar maintenance functions, somewhat like the operation of cleaning the interior of the head assembly. Associated movements will now be described.

ROLL FRAME MOVEMENT

If the apparatus is being operated under normal conditions and the end of a run of a particular tire tread size is reached, the apparatus is shut down, opened and cleaned before a new run of a different size tire tread is initiated. The sequence of operations to open the apparatus begins with movement of the roller 70. Referring now to FIGS. 1, 2 and 3, the roller 70 and means 71 for rotating the roller, must be moved from their normal operational position to enable access to the head assembly 30 and to the dies 40 and 50 which are the critical parts of the machine that must be cleaned. The roller 70 and means 71 for rotating the roller are both mounted either within or adjacent a roll frame 73 that, in turn, is mounted on a roller track 78. The roller track is comprised of a way 79, along which the roll frame 73 can be slideably moved by a means 72 (FIG. 1) for moving the roll frame. The way 79 can be best seen in FIGS. 1 and 2.

When operation of a particular run has been completed, the roller 70 is first moved approximately 0.2 inches (0.5 centimeters) away from the head assembly 30. This is initiated mechanically by turning a wheel 75 of a roller adjustment assembly 76.

The roller adjustment assembly 76 is partially shown in FIG. 1. This assembly comprises a typical worm gearing arrangement that moves the roller 70 horizontally. A position gauge 77 with a dial readout is mounted on the side of the roll frame 73 to indicate the position of the roller 70. The machine operator uses this gauge 77 to be certain the roller has been returned to the correct position before beginning extrusion operation.

Thereafter, four small cylinders 101 that cooperate with four (4) separate locking device assemblies 102 are actuated to unclamp the roll frame 73 which frees the roll frame to permit movement of that frame along the roller track 78.

Figure 9:
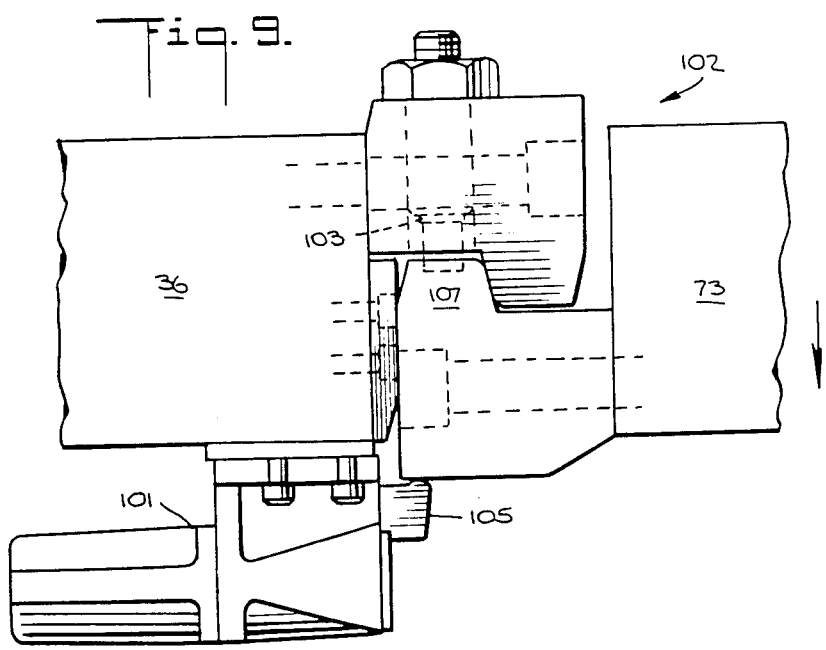
FIG. 9 is an enlarged plan view of the roll frame locking device assembly of FIG. 8, in a locked position.

Referring briefly to FIGS. 8 and 9, a plan view of a single locking device assembly 102 is shown. FIGS. 8 and 9 depict a plan view of the lower assembly 102 from FIG. 1 as seen from below the apparatus 10. In FIG. 8 the assembly 102 is in an unlocked position, and in FIG. 9, the assembly is in a locked position. In the locked position, a locking knob 105 is extended by a small cylinder 101 to physically prevent the roll frame 73 from moving in respect to the head frame 36. The direction of movement of the roll frame 73 is indicated by the arrows. In FIG. 8 the locking knob 105 is retracted permitting the roll frame 73 to move. To assist the roll frame 73 in disengaging from the head frame 36 of the apparatus 10, the locking device assemblies 102 are each provided with a hydraulic press point 103 that extends outwardly to actually "kick" a cooperating member 107 of the roll frame 73 out of the locked position and initiate lateral movement of the roll frame along the roller track. Referring again to FIGS. 1-3, a heavy duty cylinder 104 is then actuated to move the roll frame 73 laterally, (from left to right in FIG. 2) along the roller track. This action removes the roller 70 from the space normally occupied by the roller during extrusion operation to permit uninhibited access to critical parts of the apparatus.

At this stage in the sequence of operations to open the apparatus 10, the die holder 31 must be removed followed by the opening of the head assembly.

DIE HOLDER REMOVAL

Before the upper and lower head sections 16 and 17 can be opened, the die holder and the dies themselves must be removed from their normal position between the head assembly 30 and the roller 70. Referring now to FIG. 11, there is shown a die holder clamping mechanism 110 that includes a moveable flange 114 that is extended forward (to the left in FIG. 11) and then pressed downwardly to hold the die holder 31 in place during extruding operations. In FIG. 11, the flange 114 is shown with a solid outline in a retracted position which permits removal of the die holder 31. To extend the flange 114, an air cylinder 116 is actuated to push the flange forward. After the flange is extended, two clamping blocks 118 (one of which is shown in FIG. 11) are extended downwardly to physically push the flange 114 downwardly against the die holder 31, thereby holding the die holder in position.

If the machine operator wishes to remove the dies, the above process is reversed and the flanges 114 are retracted back into the upper head section 16. This action permits removal of the dies from the head assembly 30 which then clears the way for movement of the upper and lower head sections 16 and 17.

OPENING OF HEAD ASSEMBLY

As described previously, the upper and lower head sections, 16 and 17 respectively, are opened for the purpose of permitting access to the flow chambers 60 within the head assembly to clean out accumulated extrusion material. Referring now to FIGS. 3, 4, 5 and 6, after the roll frame 73 is moved to the side as shown in FIG. 3 and the dies have been removed from the apparatus 10, a pair of side clamps 120 must be repositioned before the upper and lower head sections can be swiveled.

To understand the movement of the side clamps 120, it must be first appreciated that each side clamp is a part of a large, moveable side clamp assembly 122 (best seen in FIGS. 4, 5 and 6) that can be shifted forward and backward in respect to the head section (to the right and left in FIG. 4). The side clamp assembly 122 also includes a cylinder mounting bracket 124, two connecting shafts 126 along with a large side cylinder 128 and a small side cylinder 129. The two connecting shafts 126 connect the cylinder mounting bracket 124 to the side clamp 120. The shafts 126 are also slideably mounted in sleeves 127 that are fixed to the head frame 36. The mounting of the shafts 126 permits the entire side clamp assembly to move forward and back along with the shafts by sliding inside the sleeves 127.

Movement of each side clamp assembly is actuated by the large side cylinder 128 the piston rod end of which is fixed to the cylinder mounting bracket 124 and the cylinder end of which is fixed to the head frame 36. With this arrangement, extension of the piston rod out of the large side cylinder 128 will push the entire side clamp assembly backwards or away from the roller 70 (to the left in FIG. 4). Retraction of the piston rod of the large side cylinder will return the side clamp assembly 122 along with the side clamps 120 to a forward position, toward the roller 70 as indicated by the arrow in FIG. 4.

In FIG. 1, the side clamps 120 are shown in a non-extended or back position away from the roller. This position of the side clamps holds the upper and lower head sections 16 and 17 in position during extruding operations. After the roller 70 is moved to the side as described previously, the side clamp assembly is extended forward to the position shown in FIGS. 4, 5 and 6, releasing the upper and lower head sections.

Referring briefly to FIGS. 3, 4 and 6, the side clamps 120 are provided with interfacing surfaces 150 that have a "double taper", or, in other words, are angled in both the horizontal plane, as can be seen in FIG. 3, and in the vertical plane, as can be seen in FIG. 4. It can also be appreciated that the interfacing surfaces 150 cooperate with matching surfaces 152 that are built into the upper and lower head sections 16 and 17. The double taper of these surfaces holds the sections of the head assembly in position. It can also be appreciated in FIGS. 3 and 4 that it is necessary to move the side clamps 120 forward first before swinging the side clamps to the side.

Referring again to FIGS. 4, 5 and 6, after the side clamp assemblies 122 are extended forward, the smaller side cylinders 129 are actuated to retract to swivel the side clamps about swivel joints 123 which swings the side clamps out away from the head assembly 30 to permit full freedom of movement of the head sections and relatively unrestricted access to the flow chambers 60 within the head assembly 30 for cleaning purposes. After the side clamps 120 are swung to the sides, the upper and lower head sections 16 and 17 are swiveled upwardly and downwardly, respectively, as previously described.

When the operator has finished cleaning the apparatus 10 and wishes to resume extruding operations, the procedures described are reversed in sequence to return the apparatus 10 to its operating position.

RETURN OF ROLL FRAME

After portions of the head assembly have been cleaned, the dies have been replaced and the side clamps actuated to lock the head assembly in place, the roll frame 73 must be returned to its normal operational position. Referring to FIGS. 1, 2 and 3, the roll frame 73 is returned along the roller track 78 to its normal position by again actuating the large heavy duty cylinder 104 to move the roller 70 laterally. The roll frame 73 is then locked with respect to the head assembly 30 by actuating the four cylinders 101 which clamp the roll frame 73 into its proper position in relation to the head assembly. The roller 70 is then moved radially towards its final position adjacent the head assembly 30 by means of the hand wheel 75 and adjustment assembly 76.

It can be appreciated from FIGS. 1, 2 and 3 that the four locking device assemblies 102 in conjunction with each other form a "four point" or essentially rectangular load bearing structure for locking the roll frame 73 to the extruder head assembly 30. This "four point" load bearing structure is very important for the purpose of absorbing forces developed during operation of the apparatus 10 and maintaining the proper position of the roller 70 in respect to the dies. Proper positioning of the roller 70 is essential during the process of extruding in order to maintain the correct size and shape of the final extrudate. By forming a "four point" load bearing structure, the four locking device assemblies 102 are advantageously located to absorb twisting forces or torque loads generated between the dies and the roller 70 during the extrusion process. The four point structure will inherently absorb vertical torque loads, horizontal torque loads or combinations of both.

Therefore, it can now be appreciated that the roll frame structure 73 is uniquely designed to be moved laterally out of the way for easy cleaning of the dies and head assembly of the apparatus 10 and additionally, to be properly locked into position during extrusion in such a manner that the roller 70 is maintained in the proper position despite the forces generated during the extrusion process.

After the roller 70 has been moved laterally back into its position 74 (FIG. 3) normally occupied during machine operation and the roller 70 is returned into position with the roller position adjustment assembly 76, the apparatus is ready to resume normal extrusion operation.

DIE HOLDER AND DIES

Referring now to FIG. 10, a die holder 31 along with a preform die 40 and final die 50, both of which are held in position by the die holder 31, are shown in relation to the roller 70 in the position that would be occupied by the dies during extruding operation of the apparatus. The die holder 31 is provided with an upper flange 39 that hooks over the upper surface 37 of the head assembly 30 for the purpose of holding the die holder 31 in position during machine operation.

Figure 13:
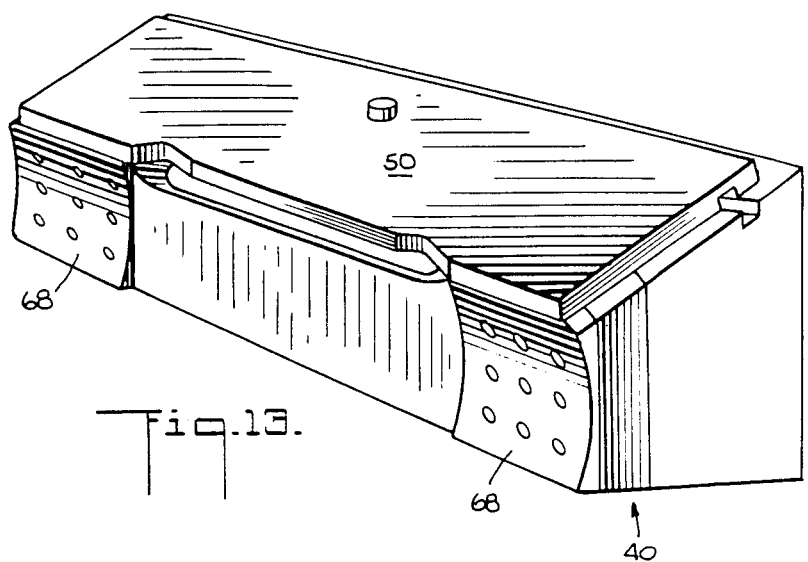
FIG. 13 is a perspective view of the preform die and final die of the subject invention, in assembled form.

It can be readily appreciated from FIG. 10 that there is a very close and critical physical relationship between the dies 40 and 50 and the roller 70. The placement of the dies in relation to the roller must be maintained within specific tolerances in order to properly extrude the elastomeric strip from the dies onto the roller 70. To maintain this physical relationship, the faces of the dies are provided with nylatron pads 68 shown in FIG. 13, the ends of which are formed with a radius that is almost identical to the radius of the roller 70. During operation of the apparatus 10, the ends of the nylatron pads 68 actually rub against the rotating roller 70 while the elastomeric strip is being extruded out onto the roller itself.

Referring only to FIG. 10, a cross sectional view of the preform die 40 and final die 50 along with the configuration of the first and second flow chambers 47 and 48, within those dies can be readily appreciated. Again, the dies are positioned in respect to the roller 70, a portion of which is shown in FIG. 10, in the physical relationship that would be utilized during extruding operation of the apparatus. As has been described previously, the elastomeric material is extruded through the head section 30 into the preform die 40 at specific pressure and temperatures.

In the die configuration shown in FIG. 10, a first elastomeric material is extruded into a first flow chamber 47 in the range of approximately 300–900 pounds per square inch of pressure (2070–6200 kilograms per square meter). The material that is extruded into this flow chamber 47 is the main tread (cap portion) material and will form a majority of the cross-sectional profile of the finally extruded tread slab that is extruded out onto the roller 70.

Below the first flow chamber is a second flow chamber 48. This flow chamber 48 receives a different elastomeric material, for example, the material for the tread base portion and/or the wing portions, again at a specific pressure. In the apparatus shown, the material enters flow chamber 48 in the range of approximately 300–900 pounds per square inch of pressure (2070–6200 kilograms per square meter).

While the configuration shown in FIG. 10 illustrates two separate flow chambers 47 and 48 each provided with a different elastomeric material, it is contemplated by the inventors that the subject invention may employ more than two materials, for example three or four separate materials for producing a tread slab with three or four different materials in specific locations within the tread.

It is also contemplated that widely varying temperatures and pressures of extrudate may be utilized. The pressures noted above serve as examples only.

The section of the preform die 40 that contains the first and second flow chambers 47 and 48 is a first section 62 of the preform die and this first section is made of a single piece of material. At a downstream end of the first section 62 (the left hand side as shown in FIG. 10), a common junction 42 of the material flowpaths occurs within the preform die 40. That is to say the tread cap and base flowstreams join together and the wings and cap flowstreams join together, each along discrete parting lines, such as the parting line 45. Guidelines previously given for the flow chamber 60 generally apply equally to the first and second flow chambers 47 and 48 as well.

These guidelines for the configurations of the flow chambers and the direction of flow of the extruded material have been found to be suitable for the joining of two materials into a satisfactory tire building component. These and other technical or engineering considerations required to manufacture tire building components from multiple elastomer compounds can be summarized in the following manner.

First of all, it is necessary to determine how many elastic compounds must be incorporated into one strip which will be applied to a raw tire carcass. When the number and approximate location of each are known, the extruder, preform and final die configuration can be designed. The final object is to get all materials into the strip in the proper locations in the correct volumes so the final die can form a single strip of the multiple materials which will present a smooth contour or programmed rugosity on the outer tire surface to prevent folds and cracks and present a smooth surface on the bottom to prevent air entrapment in the tire carcass and reduce carcass blows.

Secondly, the flow chambers should be made a minimum length. Longer flow chambers tend to increase pressure of the material which also tends to increase extrusion temperature. Higher pressures and temperatures present design difficulties that are to be avoided, if possible.

Thirdly, a gradual increase or decrease in cross-sectional area of the flow chamber is desirable in order to change velocity of material flow in a gradual and progressive manner. Erratic material velocity changes tend to build excessive pressures which again increase material temperatures and can damage the extrudates. It has been found that it is desirable to provide a minimum passage opening at the entrance to the preform die 40 of at least ½ inch (1.27 centimeters) in height with a width that is determined by the extrudate width plus about ⅜ inch (0.95 centimeters). The opening of the flow chamber may be more than ½ inch in height to accommodate thicker extrudates if that is so desired. Generally, it has been found that it is desirable to provide a flowpath in this region that is ¼ inch (0.64 cm.) greater in thickness than the final thickness of the final extrudate. This configuration permits material to flow without unreasonable friction losses.

It is notable that material flows in each of the chambers such that the material in the center of the chamber tends to flow faster than the material adjacent the chamber walls. Material flow at the walls is slowed by frictional forces that normally build pressure to about 500 to 1200 pounds per square inch (3500–8300 kg/square meter) for normal materials. Because of this, the average velocity of the material in each chamber is important because the splice at the junction 42 occurs with a stock at the edge of the flow chamber which is moving at a slower rate. If this pressure is not present, the point of junction should be moved closer to the extruders.

Fourthly, the material flow within the chambers 47 and 48 can be turned in any direction as the material works toward the junction as long as the final direction of flow is within 90 degrees of the flowpath direction just after the materials are joined.

Fifth, it has been found that junctions of materials are best made one at a time. If two separate materials are brought together into a common passage, after they are joined the junction or boundary between the materials cannot be changed thereafter. The different materials will proceed through their common flowpath as a single entity of elastomeric material.

Sixth, elastomer compounds are incompressible with essentially the bearing strength of steel, therefore, they will flow in the mechanical confines of the head assembly, preform die and final die dimensions in a manner to exhibit a uniformity of extrusion on a constant volume basis. This feature of the invention means that several slabs of various outline dimension can be extruded with a change in volume output of the extruders and a change in the final die opening. What this means to the finally extruded tread slab or elastomeric strip is that the cross-sectional area of each different material in the final extrudate is determined by the ratio of the volume of feed of each extruder. Therefore, the operator of the apparatus can vary the cross-sectional area of each material in the final extrudate by simply varying the feed rate of each extruder. This also will control the location of the boundary 45 (shown in FIG. 21) between the different materials within certain parameters. The ability to control this boundary location 45 is very significant for producers of tread slab and is very important to tire manufacturers for the purpose of maintaining the integrity of the material boundary within the tread portions of tires. Radical changes in boundary location 45 generally require changing the preform dies.

Figure 15:
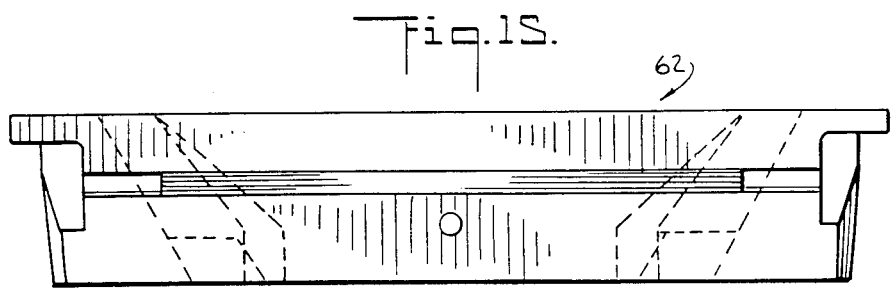
FIG. 15 is a plan view of a first section of the preform die.
Figure 16:
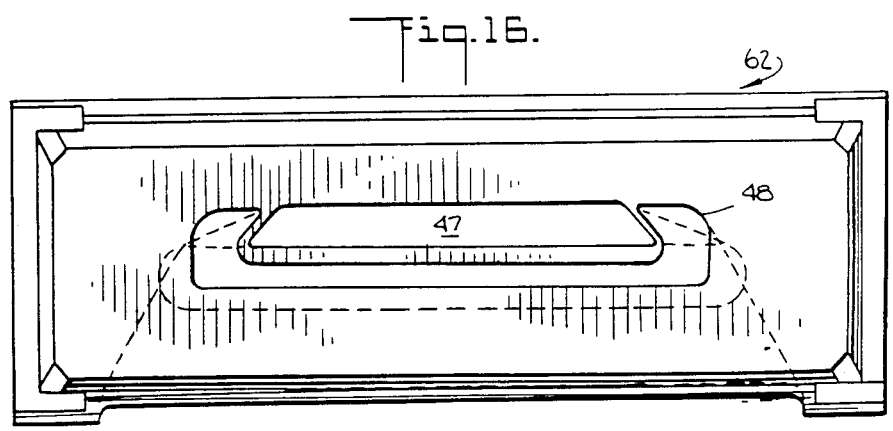
FIG. 16 is a front elevation view of the first section of the preform die.

Additional views of the first section 62 of the preform die are illustrated in FIGS. 14, 15 and 16. Specifically, FIG. 16 illustrates the view of the first section 62 as seen from the front or, in other words, in front of the apparatus 10. The second flow chamber 48 as shown in FIG. 16 will contain the elastomeric material that is intended for the tread base and wings of the final tire tread slab. As mentioned previously, this material will normally be softer, or have a higher viscosity for the purpose of improving handling characteristics of the tire and additionally improving rolling resistance characteristics. The first flow chamber 47 is provided with the material for a main tread or cap portion of the final tread slab. This material will normally have a lower viscosity for the purpose of improving tread life or longevity. The internal flowpath outline of each of these chambers 47 and 48 through the length of the first section 62 are depicted with dashed outlines in FIGS. 15 and 16.

FIG. 15 is a plan view of the first section 62 and when combined with FIGS. 10 and 16, it is easier to understand the configuration of the flow chambers of the material through this first section.

Referring again to FIG. 10, at the downstream end of the first section 62 of the preform die, the two flow chambers 47 and 48 are still separated. A second section 64 of the preform die 40 receives the two different materials flowing through the two chambers within the first section 62 and combines those two different materials at the common junction 42. It is notable that the material flowpath from the second flow chamber 48 makes two changes in direction in order to join the material flowing through the first flow chamber 47. Each of these directional changes is less than 90 degrees.

When two different materials are brought together at a junction in a continuation of two former passages into a single final passage, the exit passage should be slightly larger than the combination of the initial two passages areas leading to the junction. From the junction onward, a gradual passage cross-sectional area increase or decrease may be resumed in whatever fashion is desirable.

It is also noteworthy that the pressure of the material inside the flowpath tends to decay as the material reaches the final die 50 where internal pressure rapidly decreases as the materials exit the final die in the extrusion process. It has been found that junctions of material generally cannot be made satisfactorily unless they occur at least one inch (2.54 centimeters) upstream of an exit from the final die 50. By joining the materials at least one inch upstream of the final die exit, a wider variety of materials can be successfully extruded and additionally, the extrusion can be performed in this satisfactory manner without complex shaping of flow passages within the dies themselves.

The region between the junction 42 and the final die 50 is the preform die exit chamber 44. It has been found that the boundary between materials within the common passage of this exit chamber 44 can be maintained both in respect to general configuration and physical dimension. The purpose of the preform die exit chamber 44 is twofold. First, the exit chamber physically separates the common junction 42 from the final chamber 54. The physical separation prevents pressure from decreasing too rapidly after the materials are joined and permits the different materials to adhere to each other before being subjected to the changes in pressure and flowstream direction occurring at the final chamber 54. Secondly, the preform die exit chamber 44 permits volumetric sizing of different materials within the finally extruded elastomeric strip. The different materials are permitted to adhere to each other while traversing the preform die exit chamber to form a material boundary that is strong enough to maintain its location while transversing the final die.

If the preform die exit chamber is long enough to permit the material boundary to unalterably establish itself, then the relative volume of different materials in the finally extruded elastomeric strip is also established. This permits what is referred to as "volumetric sizing". With volumetric sizing the machine operator can change the material boundary location by varying the flow rate of one of the materials into the common junction. This, of course, is important to tire manufacturers where the demands of the tire tread require that the material boundary be maintained within a certain tolerance and yet be variable when so desired.

As noted previously, it has also been found that the boundary between the materials can be varied or moved significantly by changing relative feed ratios of the different materials from the extruders. This ability to vary the material boundary location is very desirable because it permits the user of the machine to maintain the boundary location at the desired location without having to shut the machine down to change dies. It also enables successful operation of the apparatus with a smaller number of dies while still enabling a wide range of material boundary location variation.

Referring now to FIG. 18, a front elevation view depicts the flow chambers of the material from the common junction 42 generally depicted with a dashed outline, through the preform die exit chamber 44 to a downstream end 49 of the second section 64 of the preform die 40. At the downstream end 49, the material cross-sectional configuration has assumed a generally rectangular shape that is ready for extrusion through a final die onto a rotating roller. The two separate materials are properly located within this common flowpath while the relatively simple outer contours permit extrusion through a roller die without unnecessary complications.

FIG. 17 depicts an overhead or plan view of the second section 64 of the preform die and additionally shows the position of the nylatron pads 68 on the two sides of the flowpath. These nylatron pads 68 form a boundary to the material flowpath in the extrusion process as well as provide a surface which can be rubbed against the rotating roller during extrusion operation which inherently maintains the dies in their proper location during the extrusion process.

Referring again to FIG. 10, the final step of the extrusion process takes place within a final chamber 54 that is formed between the final die 50 and the roller 70 itself. As the material flows through the downstream end 49 of the second section 64, it enters the final chamber 54 and is turned through an angle of between 30° and 90° while it is extruded through a restriction orifice 56 onto the roller 70. The size and configuration of the restriction orifice 56 determines the thickness of the final extrudate after the completion of the extrusion process. It has been found through successful operation of the apparatus 10 by the inventors that a multiple material flow of elastomeric materials can be extruded through such a final chamber 54 onto a roller while maintaining the integrity of the material boundaries. However, the final die can only change the general shape of the extrudate from a generally rectangular shape, into relatively minor variations of the rectangular shape, such as a tread contour.

In FIG. 21 a cross-section of a typical final extrudate in the form of a tire tread slab 140 is depicted as an example only. One material is distributed through the tread base 142 and wings 144 of the tread slab. A second material is distributed through a main body or cap portion 146 of the tread slab. A typical boundary location 45 between different materials is shown. As described previously, the location of this boundary can be altered by changing material flow rates.

A change in thickness occurs in the material flow after exiting the final chamber 54. As shown in FIG. 10, the material flow "swells" or increases in thickness approximately 10 percent after leaving the final chamber. It is desirable to decrease this change in thickness, commonly referred to as "die swell" because high levels of die swell tends to increase the variation in dimension of final extrudate.

One of the reasons the apparatus of the subject invention tends to minimize die swell is that the early progressive junction of materials, in combination with the roller-die at the final chamber 54, permits extrusion operation at generally lower pressures than is the case in previous tire tread extruders. Operating at lower pressures is possible because the roller 70 tends to draw the extrudate out of the final die 50, so the material doesn't have to be forced out of the final die with high pressure.

Referring now to FIGS. 19 and 20, an overhead elevation view and front elevation view respectively, of the final die 50 are depicted. As can be appreciated from FIG. 10 the restriction orifice 56 is formed on one side by the final die 50 along with side elements 53 of nylatron, and on the other side by the roller 70.

Multiple material preparation of tire building strips is very logical and desirable in the development of radial ply building components. At least one completed tread currently features 8 different stocks in 13 separate strips, if extruded individually. Although the equipment has not been developed, a logical objective for current radial ply tread requirements would be the use of:

(1) A triple extruder apparatus to make black sidewalls using three different materials for a rim flange, a black sidewall and a breaker cushion;

(2) A quintuple extruder apparatus to make white sidewalls using five different materials for a rim flange, a white sidewall, a cover strip, a black sidewall and a breaker cushion;

(3) A quadruple extruder apparatus for treads using four materials for a tread, a wing stock, a tread base and a recoat layer.

Each of these machines would be likely to employ the teachings of the subject invention as described herein to join several materials for extrusion through a roller-die combination.

Numerous alterations of the structure in addition to those herein disclosed will suggest themselves to those skilled in the art. However, it is to be understood that the present disclosure relates to preferred embodiments of the present invention which are for purposes of illustration only and not to be construed as limitations of the invention.

We claim:

1. Apparatus for forming an elastomeric strip comprising a roller; a final die confronting and in spaced relation convering toward said roller, said final die and roller cooperatively defining a final chamber terminating in a restriction orifice; extrusion means for advancing a two or more elastomeric materials under pressure toward said final chamber; a head assembly and a preform die in serial flow relationship positioned between said extrusion means and said final die; flow chambers formed within said head assembly and said preform die for intercommunicating said extrusion means and said final chamber, said head assembly flow chambers originating at the interface of said head assembly with said extruder means and continuing into said preform die, said preform die flow chambers converging to at least one common junction within said preform multimaterial flow having a desired amount of each of two or more elastomeric materials is established within said preform die, and said preform die exist chamber communicating with said final chamber where said multimaterial flow is finally shaped and deposited as an elastomeric strip onto said roller without altering the relative amounts of each elastomeric material.

2. Apparatus for forming an elastomeric strip comprising a roller; a final die confronting and in spaced relation converging toward said roller, said final die and roller cooperatively defining a final chamber terminating in a restriction orifice; extrusion means for advancing a two or more elastomeric materials under pressure toward said final chamber; a head assembly and a preform die in serial flow relationship positioned between said extrusion means and said final die; flow chambers formed within said head assembly and said preform die for intercommunicating said extrusion means and said final chamber, said head assembly flow chambers originating at the interface of said head assembly with said extruder means and continuing into said perform die, said preform die flow chambers converging to at least one common junction within said preform die to form a single preform die exit chamber wherein said elastomeric materials adhere to each other to establish a material boundary location within said elastomeric strip with a desired amount of each material and a desired discrete parting line between materials established within said preform die exit chamber, said preform die exit chamber communicating with said final chamber where said elastomeric strip is finally shaped and deposited onto said roller without altering the relative amount of each material established within the preform die and without significantly altering the discrete parting line.

3. The apparatus recited in claim 2 wherein said materials adhere to each other while traversing said preform die exit chamber and said material boundary location is maintained within said elastomeric strip while said strip is traversing said final chamber.

4. The apparatus recited in any one of claims 1, 2 or 3 wherein said preform die exit chamber has an essentially straight flowpath.

5. The apparatus recited in any one of claims 1, 2 or 3 wherein said preform die exit chamber is at least 1 inch (2.54 centimeters) in length.

6. The apparatus recited in any one of claims 1, 2 or 3 wherein said roller is mounted within a roll frame and said roll frame is provided with means for moving said roll frame along the direction of the axis of rotation of said roller a sufficient distance to provide access to said dies from a space normally occupied by said roller during extrusion operation of said apparatus.

7. The apparatus recited in claim 6 wherein said roll frame and head assembly are provided with four locking device assemblies for locking said roll frame to said head assembly during extrusion operation.

8. The apparatus recited in claim 7 wherein said four locking device assemblies are mounted around said roller within said roll frame for the purpose of absorbing torque loads generated during extrusion operation of said apparatus.

9. The apparatus recited in any one of claims 1, 2 or 3 wherein each of said flow chambers in said head assembly is provided with a different elastomeric material from said extrusion means, each material being extruded at a desired volumetric flow rate and wherein the ratio of flow rates of material directly corresponds to final ratios of material in the finally extruded elastomeric strip.

10. The apparatus recited in any one of claims 1, 2 or 3 wherein said preform die is provided with first and second flow chambers at its upstream end, said first flow chamber for receiving a first elastomeric material and said second flow chamber for receiving a second elastomeric material, said first and second flow chambers converging at said common junction and wherein said elastomeric strip is a tire tread slab wherein said first elastomeric material forms a main tread portion of said tire tread slab and said second material forms a cap base and wing portions of said tire tread slab.

11. A method of forming an elastomeric strip comprising the steps of:
   a. extruding two or more elastomeric materials under pressure into separate flow chambers within a head assembly;
   b. progressively converging said elastomeric materials together at a common junction in a preform die to form a single multi-material flow within a preform die exit chamber;
   c. directing said multi-material flow in said preform die exit chamber into a final chamber formed between a final die and a rotating roller; and
   d. finally extruding said elastomeric strip through a restriction orifice onto said roller.

12. The method recited in claim 11 including the step of adhering said elastomeric materials to each other within said preform die exit chamber to establish a material boundary location within said elastomeric strip.

13. The method recited in any one of claims 11 or 12 including the step of varying relative percentage of different materials within the elastomeric strip by correspondingly varying volumetric flow rate of materials within said flow chambers within said head assembly.

* * * * *

UNITED STATES PATENT AND TRADEMARK OFFICE
CERTIFICATE OF CORRECTION

PATENT NO. : 4,683,095

DATED : Jul. 28, 1987

INVENTOR(S) : Tolonen et al.

It is certified that error appears in the above—identified patent and that said Letters Patent is hereby corrected as shown below:

Column 16, Line 40, after "preform" insert -- die to form a single preform die exit chamber wherein a --

Column 16, Line 43, cancel "exist" and insert -- exit --

Signed and Sealed this

Nineteenth Day of January, 1988

Attest:

DONALD J. QUIGG

Attesting Officer

Commissioner of Patents and Trademarks